V. W. McADAMS.
HUMIDIFYING APPARATUS.
APPLICATION FILED MAR. 12, 1918.
1,343,873.
Patented June 15, 1920.
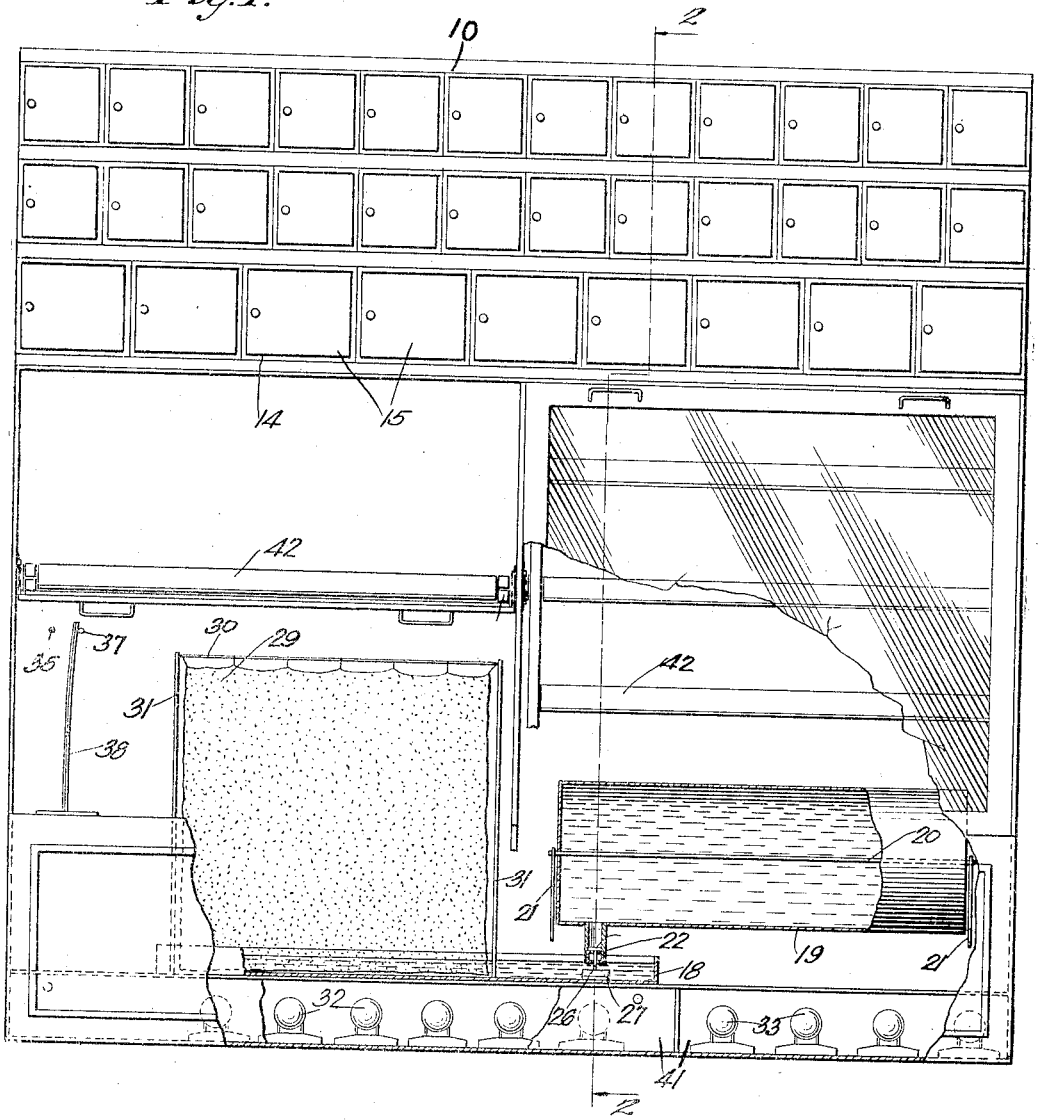
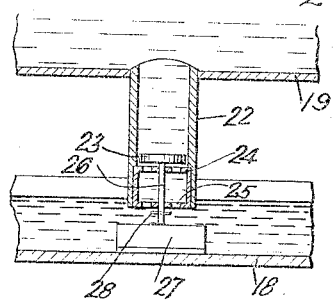
WITNESSES
INVENTOR
V. W. McAdams
BY
ATTORNEYS

UNITED STATES PATENT OFFICE.

VICTOR W. McADAMS, OF DENVER, COLORADO.

HUMIDIFYING APPARATUS.

1,343,873.   Specification of Letters Patent.   Patented June 15, 1920.

Application filed March 12, 1918. Serial No. 221,897.

*To all whom it may concern:*

Be it known that I, VICTOR W. MCADAMS, a citizen of the United States, and a resident of Denver, in the county of Denver and State of Colorado, have invented a new and Improved Humidifying Apparatus, of which the following is a description.

My invention although useful for other purposes is more especially intended for embodiment in a show case for tobacco, cigars and cigarettes.

An object of my invention is to maintain a desired degree of humidity in a show case or the like by automatically increasing the moisture on the one hand or supplying a drying heat on the other hand, the moisture supplying means and the drying means being governed by a hygroscopic controller.

Other objects of the invention will appear as the description proceeds.

Reference is to be had to the accompanying drawings, forming part of this specification, it being understood that the drawings are merely illustrative of one example of the invention.

Figure 1 is a front view of a show case embodying my invention, parts being broken away and others partly in section.

Fig. 2 is an enlarged detail in longitudinal vertical section showing a portion of an evaporating pan and a supply tank therefor.

Referring to the drawing 10 represents a show case which may be of any desired construction. As shown the case is provided at the top with compartments 14 having closures 15 and below the said compartments with two series of swinging shelves 42.

In the lower portion of the case an evaporating pan 18 is provided above which is a tank 19 revolubly supported in any suitable manner, there being indicated a rod 20 extending through the tank and having projecting ends turning in fixed bracket arms 21 on the case. The tank has a neck 22 and the tank may be turned to dispose the neck at the under side of the tank and dipping into the water in the pan 18, said neck being available as a filling neck when the tank is turned to bring the neck uppermost. If desired, a valve 23 may be disposed in the neck 22 above a hollow plug 24 movably fitting the end of the neck and having openings 25 for the outflow of water. The stem 26 of the valve projects beyond the neck 22 and when the neck is at the under side of the tank the stem rests on an element 27 elevated from the bottom of the pan 18 so that the water may flow from the neck as rapidly as it evaporates from the pan 18. When the tank is being filled the box 24 may be removed with the valve. A pin 28 passing through the valve stem below the box 24 limits the movement of the valve.

If desired, absorbent material 29 may be suitably suspended in the case as on a rod 30 supported in standards 31, so that the said absorbent material may dip into the water in the pan 18. Beneath the pan 18 is suitable heat-producing means preferably in the form of electric lamps 32 and in the case also at the bottom is a second series of lamps 33 independent of the pan 18. The lamps 32 are intended to heat the watering pan for increasing the moisture in the case while the lamps 33 are utilized for heating and drying the air in the casing should the moisture be excessive. The two series of lamps are in a circuit controlled by a hygroscopic circuit closer. The circuit may include a conductor running from the lamps 32 to a contact 35, and a conductor running from the lamps 33 to an adjacent contact 37. A hygroscopic circuit closer 38 is provided, from which a conductor wire 39 runs to close the circuit through either series of lamps according to whether the circuit closer 38 is moved against the contact 35 or 37. In practice the hygroscopic circuit closer may be of any approved construction as for example, one involving two layers of wood with the grain at right angles. Upon excessive moisture the circuit will be closed through the contact 37 and lamps 33, the latter furnishing the drying heat. On the other hand too low a degree of humidity will cause the circuit closer 38 to engage the circuit contact 35 and thus energize the lamps 32 by heating the evaporating pan. The lamps are in compartments 41 in the bottom of the case and the pan 18 rests on the top of one of the said compartments.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a structure of the character described, a case, an evaporating pan in the case a short distance above the bottom thereof, a heating device on the bottom of the case under the pan for heating the water of the pan, a second heating device on the bottom of the case for drying the air of the case, and hygroscopically controlled means for bringing either heating device into action according to predetermined condition of humidity of the air in the case.

2. In a structure of the character described, a case having a compartment at its bottom, an evaporating pan on the compartment, electric lamps in the compartment for heating the water of the pan, electric lamps on the bottom of the case at one side of the compartment for heating the air of the case, an electric circuit including the lamps, and a hygroscopic switch in said circuit for independently controlling said lamps.

3. A structure of the character described, comprising a case, an evaporating pan in the case, a tank in the case, means for automatically supplying water from the tank to the pan as it evaporates from the pan, heating means in the case for heating the water in the pan, heating means in the case for drying the air of the case, and automatic means for bringing either heating means into action according to predetermined condition of humidity in the case.

VICTOR W. McADAMS.